United States Patent
Huang et al.

(10) Patent No.: US 9,092,372 B2
(45) Date of Patent: Jul. 28, 2015

(54) MEMORY ACCESS AUTHORITY CONTROL METHOD AND MEMORY MANAGEMENT SYSTEM THEREOF

(71) Applicant: MStar Semiconductor, Inc., Hsinchu Hsien (TW)

(72) Inventors: Chien-Hsing Huang, Hsinchu Hsien (TW); Ko-Fang Wang, Hsinchu Hsien (TW)

(73) Assignee: MStar Semiconductor, Inc., Hsinchu Hsien (TW)

(*) Notice: Subject to any disclaimer, the term of this patent is extended or adjusted under 35 U.S.C. 154(b) by 75 days.

(21) Appl. No.: 14/080,863

(22) Filed: Nov. 15, 2013

(65) Prior Publication Data

US 2014/0149704 A1    May 29, 2014

(30) Foreign Application Priority Data

Nov. 29, 2012 (TW) .............................. 101144723 A

(51) Int. Cl.
*G06F 3/00* (2006.01)
*G06F 13/00* (2006.01)
*G06F 12/14* (2006.01)
*G06F 21/71* (2013.01)

(52) U.S. Cl.
CPC ............ *G06F 12/1416* (2013.01); *G06F 21/71* (2013.01)

(58) Field of Classification Search
CPC   G06F 2221/2129; G06F 9/4843; G06F 21/71
See application file for complete search history.

(56) References Cited

U.S. PATENT DOCUMENTS

| 3,891,974 | A  | * | 6/1975 | Coulter et al. ................... 703/23 |
| 4,351,024 | A  | * | 9/1982 | Bradley et al. ................ 719/310 |
| 2006/0224767 | A1 | * | 10/2006 | Taeshima ...................... 709/234 |
| 2008/0263362 | A1 | * | 10/2008 | Chen ............................ 713/184 |

* cited by examiner

*Primary Examiner* — Hyun Nam
(74) *Attorney, Agent, or Firm* — Edell, Shapiro & Finnan, LLC

(57) ABSTRACT

A memory access authority control method and a memory management system utilizing the method. By partitioning and designating permissible memory access intervals to different service programs in one system, it is ensured that each service program cannot access other service programs' confidential data. Thus, the security of confidential data is guaranteed.

12 Claims, 2 Drawing Sheets

US 9,092,372 B2

MEMORY ACCESS AUTHORITY CONTROL METHOD AND MEMORY MANAGEMENT SYSTEM THEREOF

CROSS REFERENCE TO RELATED APPLICATIONS

This application claims priority under 35 U.S.C 119 to Taiwan patent application, TW101144723, filed on Nov 29, 2012, the disclosure of which is incorporated herein by reference.

BACKGROUND OF THE INVENTION

1. Field of the Invention

The present invention relates to a memory access authority control method and related memory management system, and more particularly, to a memory access authority control method for determining permissible memory access intervals corresponding to caller programs according to program counter values and a memory management system utilizing the method.

2. Description of the Prior Art

In a normal system with a security protection mechanism, there are several caller programs, dedicated to different channel operators, stored in a television card for accessing confidential service data, also provided by corresponding channel operators, stored in the same television card, such as encoding/decoding algorithms or encryption/decryption keys. These caller programs are certificated by manufacturer of the television card. For the television card manufacturer, these caller programs and confidential service data created by corresponding caller programs stored in the television cards are trustable. However, since there is no trust relationship among the channel operators and the television card can access all of the caller programs and corresponding confidential service data provided by different channel operators, malicious channel operators may take advantage of the television card as there is no proper access authority control mechanism to preventing accessing confidential service data provided by other channel operators.

SUMMARY OF THE INVENTION

In order to solve the problem addressed in the prior art that confidential service data belonging to different channel operators in the same television card could be accessed maliciously, the present invention discloses a memory access authority control method and a related memory management system.

The memory access authority control method is applicable to a memory which includes a command address space and a service address space. The command address space stores a plurality of caller programs corresponding to a plurality of non-overlapped program counter value intervals, respectively. The service address space stores a plurality of non-overlapped permissible access intervals corresponding to the plurality of caller programs, respectively. The memory access authority control method comprising: accessing a first caller program among the plurality of caller programs in the command address space according to a current program counter value stored in a program counter; looking up or querying a look-up table for a first permissible access interval in the service address space according to the current program counter value, wherein the look-up table stores a plurality of mapping relationships between the plurality of program counter intervals and the plurality of permissible access intervals in the service address space; determining whether an access target address of the first caller program falls in the first permissible access interval to generate a result; and determining whether to permit an access of the first caller program to the service address space according to the result.

The memory management system comprises a memory, a look-up table, and a memory controller. The memory comprises a command address space and a service address space. The command address space stores a plurality of caller programs corresponding to a plurality of non-overlapped program counter value intervals, respectively. The service address space stores a plurality of non-overlapped permissible access intervals corresponding to the plurality of caller programs, respectively. The look-up table stores a plurality of mapping relationships between the plurality of program counter intervals and the plurality of permissible access intervals in the service address space. The memory controller comprises a program counter. The memory controller is configured to access a first caller program among the plurality of caller programs in the command address space according to a current program counter value stored in the program counter; look up or query a look-up table for a first permissible access interval in the service address space according to the current program counter value; determine whether an access target address of the first caller program falls in the first permissible access interval to generate a result; and determine whether to permit an access of the first caller program to the service address space according to the result.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
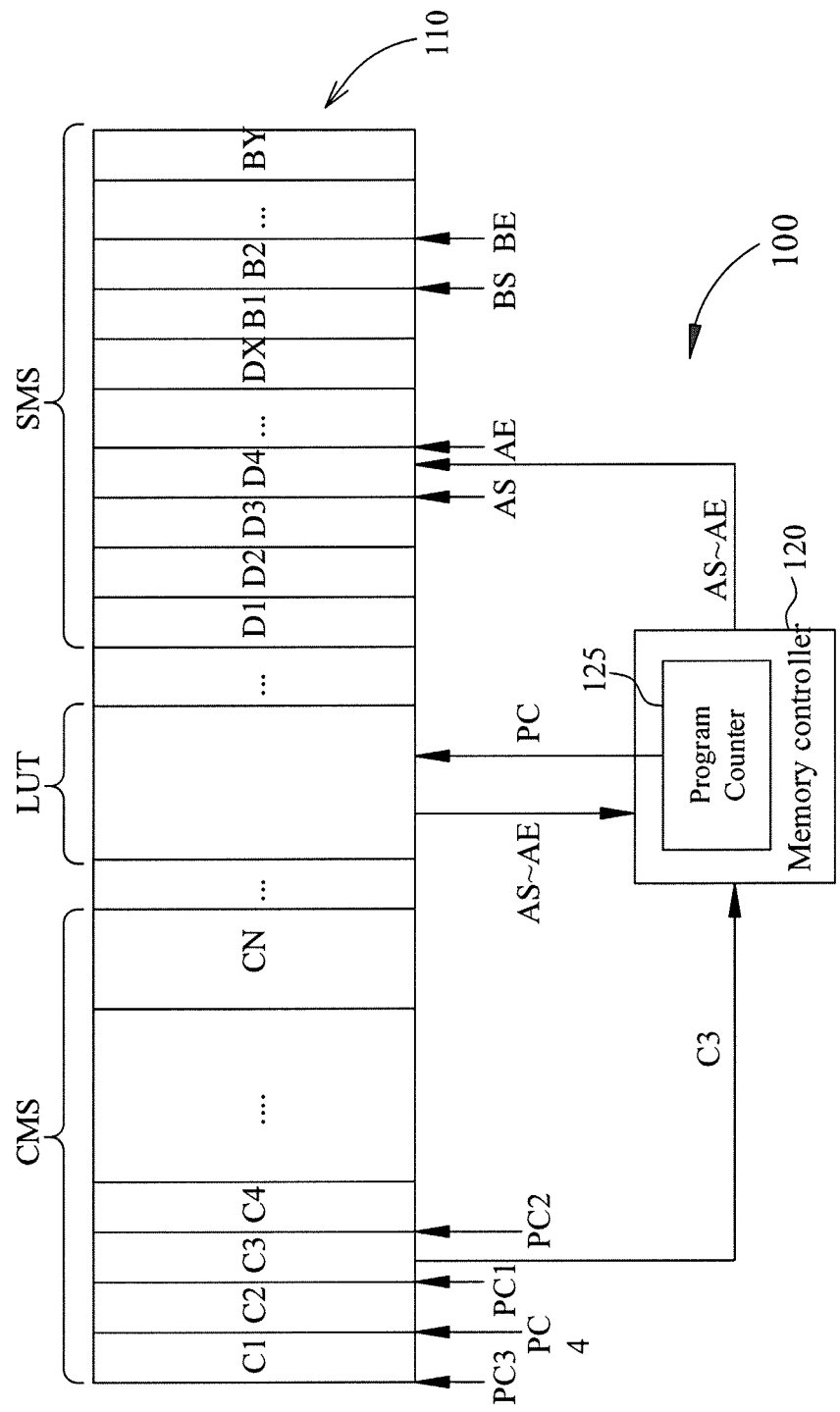
FIG. 1 is a diagram of a memory management system according to an embodiment of the present invention.

FIG. 1 shows a block diagram of a memory management system 100 according to an embodiment of the present invention. The memory management system 100 is not only applicable to a television card but also to other applications that need to provide access authority management mechanism for different services. For brevity, the following description is based on the application of television card in which the memory management system is used to manage confidential service data accessible by caller programs provided by different channel operators.

As shown in FIG. 1, the memory management system 100 comprises a memory 110 and a memory controller 120. The memory comprises a command address space (CMS), a look up table (LUT), and a service address space (SMS). The term, "address space", may refer to memory space, register space, and serial peripheral interface (SPI) flash space. The command address space CMS is arranged to store a plurality of caller programs C1, C2, C3, C4, . . . , CN, provided by different channel operators. The service address space SMS is arranged to store confidential service data and/or register group. As shown in FIG. 1, it is assumed that the service address space SMS stores confidential service data D1, D2, D3, D4, . . . , DX as well as register groups B1, B2, . . . , BY.

It is also assumed that sum of the number of confidential service data D1, D2, D3, D4, ..., DX and the number of register groups B1, B2, ..., BY equals to the number of caller programs C1, C2, C3, C4, ..., CN. In addition, the confidential service data D1, D2, D3, D4, ..., DX and the register groups B1, B2, ..., BY are one-to-one mapping to the caller programs C1, C2, C3, C4, ..., CN. Each of the register groups B1, B2, ..., BY comprises at least one register value which is a parameter for controlling an operation or representing a status of at least one other type hardware device connected to the memory management system 100.

The memory controller 120 comprises a program counter 125 for storing a program counter value PC.

For securing the execution environment with security protection mechanism, an update to the caller programs C1, C2, C3, C4, ..., CN are forbidden under any circumstances, such as an update through Internet download, so as to ensure the accessible memory intervals are fixed and unchanged. In some embodiments of this present invention, the caller programs C1, C2, C3, C4, ..., CN are written into the command address space CMS by one-time programming or mask read-only memory techniques. Alternatively, the command address space CMS is configured as a read only memory space to forbid the caller programs C1, C2, C3, C4, ..., CN to be updated under any circumstances.

Moreover, the addressing of the caller programs C1, C2, C3, C4, ..., CN in the command address space CMS is performed according to the program counter value PC. In other words, the memory controller 120 determines which one of the caller programs to be executed by the program counter value PC. By performing addressing in the command address space CMS according to the program counter value PC, each of the caller programs is corresponding to a non-overlapped interval of program counter value. Hence, the confidential service data D1, D2, D3, D4, ..., DX as well as the register groups B1, B2, ..., BY are also corresponding to non-overlapped intervals in the service address space SMS.

In one embodiment of the present invention, the caller programs C1, C2, C3, C4, ..., CN are certificated and supported by Trusted Execution Environment (TEE), respectively. Furthermore, the confidential service data D1, D2, D3, D4, ..., DX as well as the register groups B1, B2, ..., BY are also certificated and supported by Trusted Execution Environment (TEE), respectively.

The look up table LUT stores mapping relationships between the interval of program counter value corresponding to each caller program and the permissible access interval in the service address space SMS of the corresponding caller program. In one embodiment, the interval of program counter value corresponding to the caller program C3 is addressed between a program counter value PC1 and another program counter value PC2. And the confidential service data D4 addressed between a memory address AS and another memory address AE in the service address space is accessible for the caller program C3. In other words, the permissible access interval in the service memory address SMS for the caller program C3 is between the memory address AS and AE. The look up table LUT includes a mapping relationship recorded as: "if the current program counter value falls between program counter values PC1 and PC2, the service address space between memory addresses AS and AE is accessible."

Operations of the memory management system 100 are mainly executed by the memory controller 120. The operating method of the memory controller 120 is described as follows:

(1) When the program in the command address space CMS is executed to an address belonged to the caller program C3, the memory controller 120 accesses the caller program C3 (or one instruction code of the caller program C3) pointed by the program counter value PC (which is larger than or equal to PC1 and is smaller than or equal to PC2) recorded in the program counter 125.

(2) The memory controller 120 uses the program counter value PC as an index to look up the look-up table LUT and finds out the mapping relationship, "if the current program counter value falls between program counter values PC1 and PC2, the service address space between memory addresses AS and AE is accessible."

(3) The memory controller 120 checks whether an access target address of the caller program C3, which is accessed in step (1), falls between the memory addresses AS and AE in the record found in the look-up table LUT in step (2).

(4) if the access target address of the caller program C3 falls between the currently accessible memory addresses AS and AE, the memory controller 120 permits the access in response to the caller program C3.

In the case where the program counter value does not fall within PC1 and PC2, any access to the memory address interval between AS and AE is forbidden; as a result, no caller programs other than C3 can access confidential service data and the security of confidential service data. Accordingly, it is guaranteed that any caller program provided by one channel operator cannot access confidential service data provided by another channel operator. Even though there is no trusted relationship among channel operators, the data security of confidential service data provided by each channel operator is ensured.

In another embodiment, as shown in FIG. 1, the caller program C1 and the register group B2 are provided by a single channel operator such that the caller program C1 has authority to access the register group B2. Therefore a mapping relationship is recorded in the look up table LUT stated that "if the current program counter value falls between program counter values PC3 and PC4, the service address space between memory addresses BS and BE is accessible." In this circumstance, the operating method of the memory controller 120 is described as follows:

(1) When the program in the command address space CMS is executed to an address belonging to the caller program C1, the memory controller 120 accesses the caller program C1 (or one instruction code of the caller program C1) pointed to by the program counter value PC (which is larger than or equals to PC3 and is smaller than or equal to PC4) recorded in the program counter 125.

(2) The memory controller 120 uses the program counter value PC as an index to look up or query the look-up table LUT and finds out the mapping relationship, "if the current program counter value falls between program counter values PC3 and PC4, the service address space between memory addresses BS and BE is accessible."

(3) The memory controller 120 checks whether an access target address of the caller program C1, which is accessed in step (1), falls between the memory addresses BS and BE in the record found in the look-up table LUT in step(2).

(4) if the access target address of the caller program C1 falls between the currently accessible memory addresses BS and BE, the memory controller 120 permits the access in response to the caller program C1.

In the case where the program counter value falls outside of PC3 and PC4, any access to the memory address interval between BS and BE is forbidden; as a result, no caller programs other than C1 can access the register group B2 and the security of register group B2 is ensured.

In another embodiment, the mapping relationship recorded in the look-up table LUT may be denoted by relativity values. For example, the mapping relationship may be recorded as "if the current program counter value falls between program counter values PC3 and PC3+N, the service address space between memory addresses BS and BE is accessible," where N is a positive integer. Similarly, the currently accessible memory addresses may be denoted by relativity values, too. For example, a mapping relationship may be recorded as "if the current program counter value falls between program counter values PC3 and PC4, the service address space between memory addresses BS and BS+M is accessible," where M is a positive integer.

Figure 2:
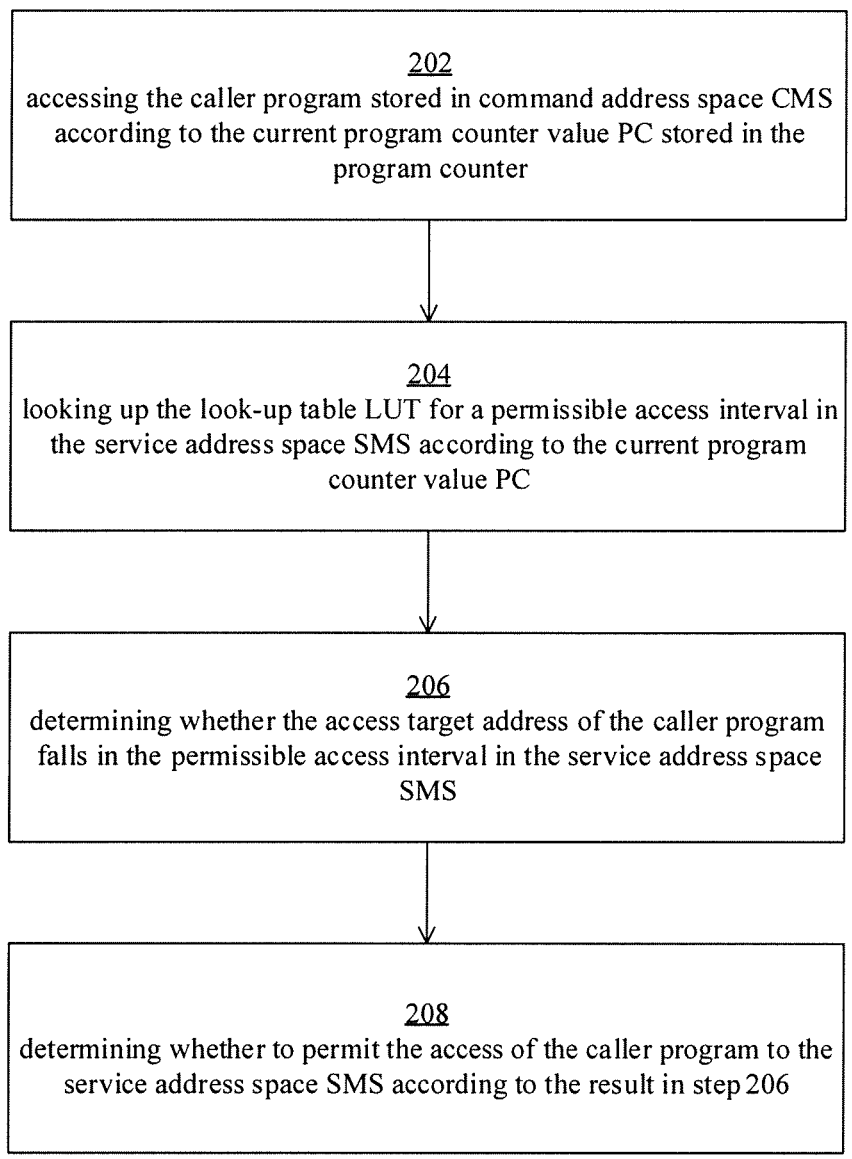
FIG. 2 is a flowchart illustrating a memory access authority control method according to an embodiment of the present invention.

Details of a memory access authority control method disclosed by the present invention are already described in the paragraphs relating to the operating methods of the memory management system 100 above. It is summarized as shown in FIG. 2, which is a flowchart illustrating a memory access authority control method according to an embodiment of the present invention. The method comprises the following steps:

Step 202: accessing the caller program, e.g., C3, stored in the command address space CMS according to the current program counter value PC stored in the program counter 125.

Step 204: looking up or querying the look-up table LUT for a permissible access interval in the service address space SMS according to the current program counter value PC.

Step 206: determining whether the access target address of the caller program C3 falls in the permissible access interval in the service address space SMS (i.e., between the memory addresses AS and AE.)

Step 208: determining whether to permit the access of the caller program C3 to the service address space SMS according to the result instep 206.

It is noted that any other embodiments derived by reasonably reordering, adding restrictions mentioned above to, or reasonably substituting steps shown in FIG. 2 are still considered as embodiments in accordance with the present invention.

The present invention discloses a memory access authority control method and a memory management system utilizing the method. By partitioning and designating permissible memory access intervals to different service programs in one system, it is ensured that each service program cannot access other service programs' confidential data. Thus the security of confidential data is guaranteed.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A memory access authority control method, applicable to a memory comprising a command address space and a service address space, the command address space storing a plurality of caller programs corresponding to a plurality of non-overlapped program counter value intervals, respectively, the service address space storing a plurality of non-overlapped permissible access intervals corresponding to the plurality of caller programs, respectively, the memory access authority control method comprising:

accessing a first caller program among the plurality of caller programs in the command address space according to a current program counter value stored in a program counter;

querying a look-up table for a first permissible access interval in the service address space according to the current program counter value, wherein the look-up table stores a plurality of mapping relationships between the plurality of program counter intervals and the plurality of permissible access intervals in the service address space;

determining whether an access target address of the first caller program falls in the first permissible access interval to generate a result; and determining whether to permit an access of the first caller program to the service address space according to the result.

2. The method of claim 1, wherein the step of determining whether to permit the access of the first caller program to the service address space according to the result further comprises:

permitting the first caller program accessing the first permissible access interval if the result shows that the access target address falls in the first permissible access interval.

3. The method of claim 1, wherein the step of determining whether to permit the access of the first caller program to the service address space according to the result further comprises:

denying the first caller program accessing the first permissible access interval if the result shows that the access target address falls outside of the first permissible access interval.

4. The method of claim 1, wherein an update to the command address space is forbidden and the command address space is arranged as a read-only memory space.

5. The method of claim 1, wherein the plurality of caller programs are written into the command address space by one-time programming or mask read-only memory techniques.

6. The method of claim 1, wherein the plurality of permissible access intervals stores a plurality of confidential service data and/or a plurality of register groups, each of the plurality of caller programs is certificated and supported by trusted execution environment (TEE), respectively, confidential service data and/or a register group corresponding to each of the plurality of caller programs are/is also certificated and supported by TEE, and each of the plurality of register groups comprises at least one register value, which is a parameter for operating at least one corresponding apparatus.

7. A memory management system, comprising:

a memory, comprising a command address space and a service address space, wherein the command address space stores a plurality of caller programs corresponding to a plurality of non-overlapped program counter value intervals, respectively, and the service address space stores a plurality of non-overlapped permissible access intervals corresponding to the plurality of caller programs, respectively;

a look-up table, storing a plurality of mapping relationships between the plurality of program counter intervals and the plurality of permissible access intervals in the service address space;

a memory controller, comprising a program counter, configured to:

access a first caller program among the plurality of caller programs in the command address space according to a current program counter value stored in the program counter;

query a look-up table for a first permissible access interval in the service address space according to the current program counter value;

determine whether an access target address of the first caller program falls in the first permissible access interval to generate a result; and determine whether to permit an access of the first caller program to the service address space according to the result.

8. The memory management system of claim 7, wherein the memory controller is configured to permit the first caller program accessing the first permissible access interval if the access target address is determined to fall into the first permissible access interval.

9. The memory management system of claim 7, wherein the memory controller is configured to deny the first caller program accessing the first permissible access interval if the access target address is determined to fall outside of the first permissible access interval.

10. The memory management system of claim 7, wherein an update to the command address space is forbidden and the command address space is arranged as a read-only memory space.

11. The memory management system of claim 7, wherein the plurality of caller programs are written into the command address space by one-time programming or mask read-only memory techniques.

12. The memory management system of claim 7, wherein the plurality of permissible access intervals stores a plurality of confidential service data and/or a plurality of register groups, each of the plurality of caller programs is certificated and supported by trusted execution environment (TEE), respectively, confidential service data and/or a register group corresponding to each of the plurality of caller programs are/is also certificated and supported by TEE, and each of the plurality of register groups comprises at least one register value, which is a parameter for operating at least one corresponding apparatus.

* * * * *